(12) United States Patent
Neely et al.

(10) Patent No.: US 8,510,353 B2
(45) Date of Patent: Aug. 13, 2013

(54) PORTABLE BUDGETING APPARATUS

(76) Inventors: Robert P. Neely, Clover, SC (US); Harold E. Allison, Shelby, NC (US)

( * ) Notice: Subject to any disclaimer, the term of this patent is extended or adjusted under 35 U.S.C. 154(b) by 876 days.

(21) Appl. No.: 12/612,799

(22) Filed: Nov. 5, 2009

(65) Prior Publication Data

US 2011/0106864 A1    May 5, 2011

(51) Int. Cl.
*H04W 4/24* (2009.01)
*G06F 7/00* (2006.01)

(52) U.S. Cl.
USPC ............................................ 708/132; 705/30

(58) Field of Classification Search
None
See application file for complete search history.

(56) References Cited

U.S. PATENT DOCUMENTS

| 4,528,638 A | 7/1985 | Hatta et al. |
| 4,833,632 A | 5/1989 | Nishimura et al. |
| 4,852,000 A | 7/1989 | Webb et al. |
| 5,021,952 A * | 6/1991 | Nishimura et al. ............. 705/30 |
| 2007/0088641 A1 * | 4/2007 | Aaron et al. .................... 705/35 |

* cited by examiner

*Primary Examiner* — Ilwoo Park
(74) *Attorney, Agent, or Firm* — Dale J. Ream

(57) ABSTRACT

A portable budgeting apparatus includes a housing with a display and input device coupled thereto. The apparatus includes an electronic memory device and processor. The processor includes programming for storing budget categories and respective modifiable money and priority values in the memory device for each budget category. Upon selection of a respective budget category and input of an expenditure value, the programming includes modifying the money value of a respective expenditure value by subtracting the expenditure value from the selected category's money value and, if the expenditure value is greater than the selected category's money value, subtracting the difference between the selected category's money value and the expenditure value from the money value of a respective category that has a money value greater than zero and a priority value that is lower than a priority value of all other the budget categories having money values greater than zero.

11 Claims, 4 Drawing Sheets

PORTABLE BUDGETING APPARATUS

BACKGROUND OF THE INVENTION

The present invention relates generally to budgeting devices and, more particularly, to a portable electronic apparatus for planning and executing a budget.

Making and following a personal budget is an important and effective way to control spending and maintain fiscal responsibility. Effectively following a budget requires setting up spending categories and assigning a maximum amount of money that can be spent weekly or monthly in each category in view of expected revenue. Accurate record keeping of expenses is critical to maintaining the budget. Of course, circumstances will sometimes dictate modifying the budget. In other words, unusual circumstances may cause the spending in one category to exceed the budgeted amount and the spending in another category may have to be reduced as a result.

Various devices have been proposed in the art for setting budget categories and tracking expenses. Although assumably effective for their intended purposes, the existing devices do not enable a user to set a predetermined maximum spending amount for multiple categories, input actual spending as it occurs, then observe as each category respectively reflects an amount remaining for spending and, if a category's limit is exceeded, the remaining balance of another predetermined category begins to be reduced.

Therefore, it would be desirable to have a portable budgeting apparatus that enables a user to set predetermined spending limits in multiple categories. Further, it would be desirable to have a portable budgeting apparatus for tracking spending and displaying remaining spending balances in each category. In addition, it would be desirable to have a portable budgeting apparatus that deducts from the balance of another predetermined category if the spending limit of a first category is exceeded.

SUMMARY OF THE INVENTION

A portable budgeting apparatus according to the present invention includes a housing with a display and input device coupled thereto. The apparatus includes an electronic memory device and processor. The processor includes programming for storing budget categories and respective modifiable money and priority values in the memory device for each budget category. Upon selection of a respective budget category and input of an expenditure value, the programming includes modifying the money value of a respective expenditure value by subtracting the expenditure value from the selected category's money value and, if the expenditure value is greater than the selected category's money value, subtracting the difference between the selected category's money value and the expenditure value from the money value of a respective category that has a money value greater than zero and a priority value that is lower than a priority value of all other budget categories having money values greater than zero.

Therefore, a general object of this invention is to provide a portable budgeting apparatus that enables a user to set up a plurality of budget categories in a portable electronic device.

Another object of this invention is to provide a portable budgeting apparatus, as aforesaid, that enables a user to input expenses and observe a display showing a remaining spending allowance in each category.

Still another object of this invention is to provide a portable budgeting apparatus, as aforesaid, that deducts an expense from another predetermined category should the respective category of an expense fall below zero.

Yet another object of this invention is to provide a portable budgeting apparatus, as aforesaid, that also displays an overall spending remainder for the entire budget.

A further object of this invention is to provide a portable budgeting apparatus, as aforesaid, that is user-friendly to operate.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
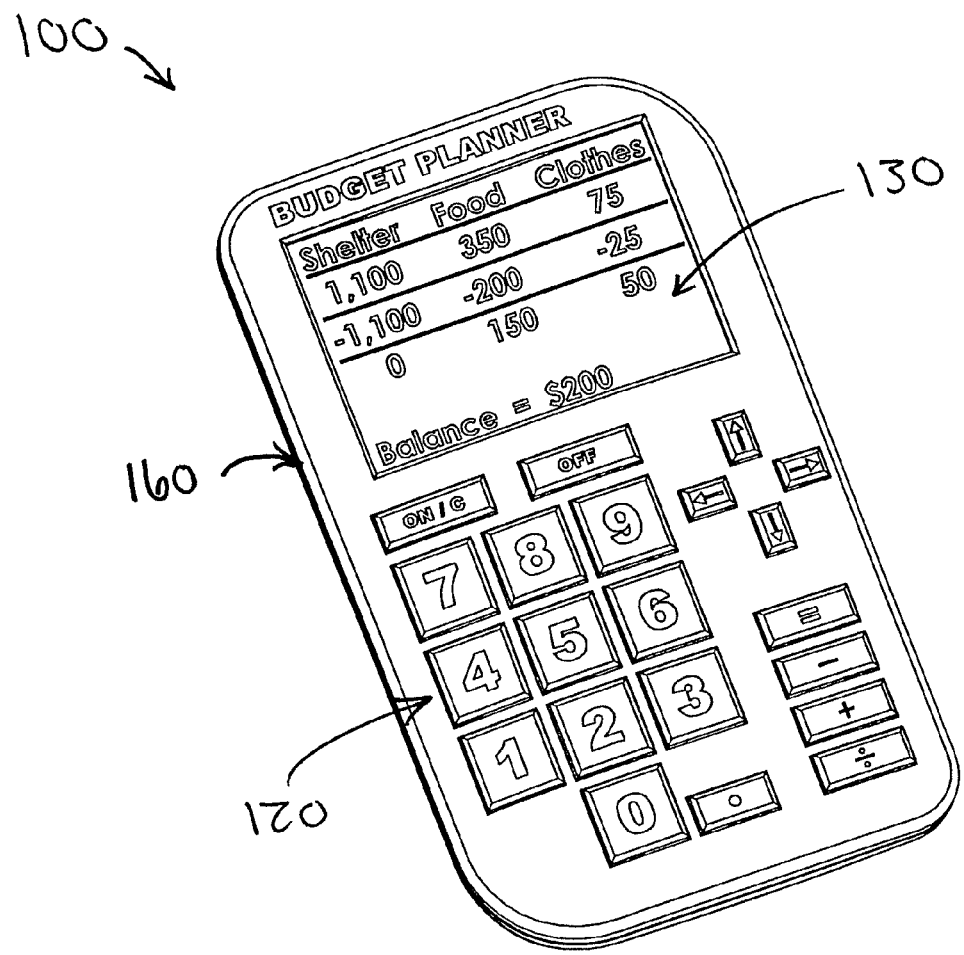
FIG. 1 is a perspective view of a portable budgeting apparatus according to a referred embodiment of the present invention.

Portable budgeting apparatus according to the present invention will now be described in detail with reference to FIGS. 1 through 4 of the accompanying drawings. More particularly, a portable budgeting apparatus 100 according to one embodiment includes a processor 110, a user input device 120, a display 130, an electronic memory device 140, and programming.

Figure 2A:
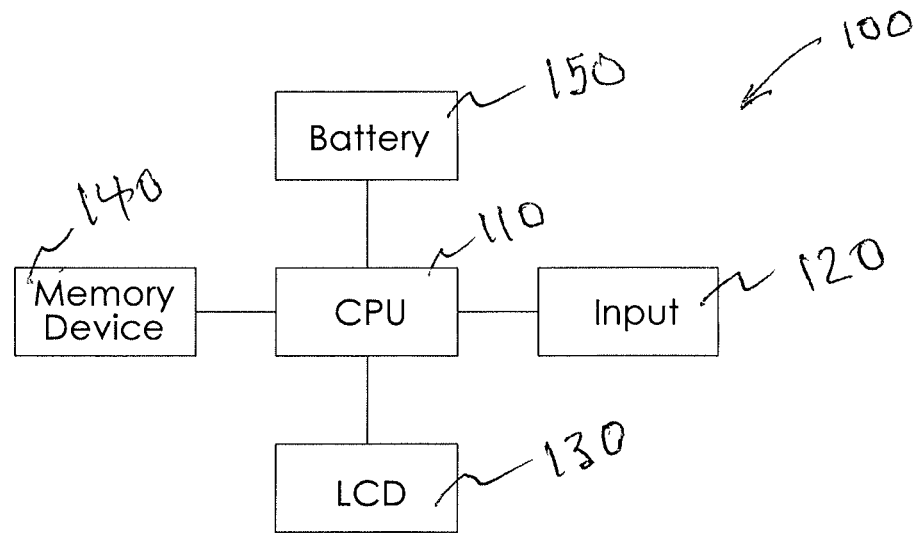
FIG. 2a is a block diagram illustrating the electronic components of the apparatus as in FIG. 1.

The user input device 120, the display 130, and the electronic memory device 140 are in data communication with the processor 110, as shown in FIG. 2a. The user input device 120 may include a keypad, one or more switch, one or more knob, a touchscreen, and/or any other input device (whether now known or later developed). The display 130 may include an LCD display, an LED display, and/or any other display (whether now known or later developed). One of ordinary skill in the art will appreciate that numerous processors utilizing different types of technology (whether now known or later developed) may be utilized as the processor 110, and that the processor 110 may include one or multiple processors. Similarly, one of ordinary skill in the art will appreciate that numerous data storage devices (whether now known or later developed) may be utilized as the electronic memory device 140, and that the electronic memory device 140 may include one or multiple data storage devices. A battery 150 (FIG. 2a) may power the electronic components of the portable budgeting apparatus 100.

As shown in FIG. 1, the user input device 120 and the display 130 are coupled to a housing 160. While the housing 160 may take various configurations, it may be preferable for the housing to be pocket-sized for portability (e.g., sized similar to a pocket calculator). Though not specifically shown in the drawings, the housing 160 may contain the processor 110, the electronic memory device 140, and/or the battery 150.

Programming (specifically set forth below in sufficient detail to enable one of ordinary skill in the art to practice the current invention) is operable by the processor 110, and may be stored in the processor 110 and/or the electronic memory device 140.

Figure 2B:
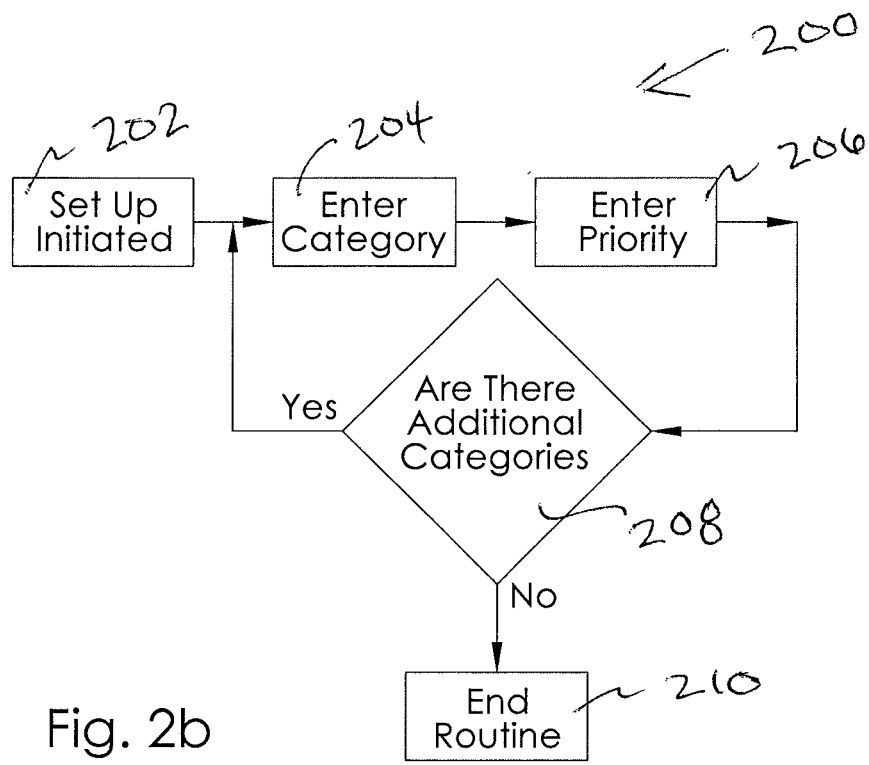
FIG. 2b is a flowchart illustrating the programming for the setup of the apparatus.

As shown in FIG. 2b, programming is included for storing a plurality of budget categories (selected using the input device 120) in the electronic memory device 140, along with a unique priority value for each budget category. More particularly, at step 202, the setup routine 200 is initiated (e.g., using the input device 120). The routine 200 then proceeds to step 204, where a budget category is selected using the input device 120 and saved into the memory device 140; the routine 200 continues to step 206. At step 206, a priority value for the budget category just input at step 204 is selected using the input device 120 and saved into the memory device 140. At step 208, the programming may cause the processor 110 to determine whether additional budget categories are desired (e.g., by actuating the display 130 to present an inquiry as to whether additional budget categories are desired, and interpreting data received from the input device 120). If additional budget categories are desired, the routine 200 may return to steps 204 and 206 for entry of a new budget category and priority value; if not, the routine 200 may end at step 210.

Figure 3:
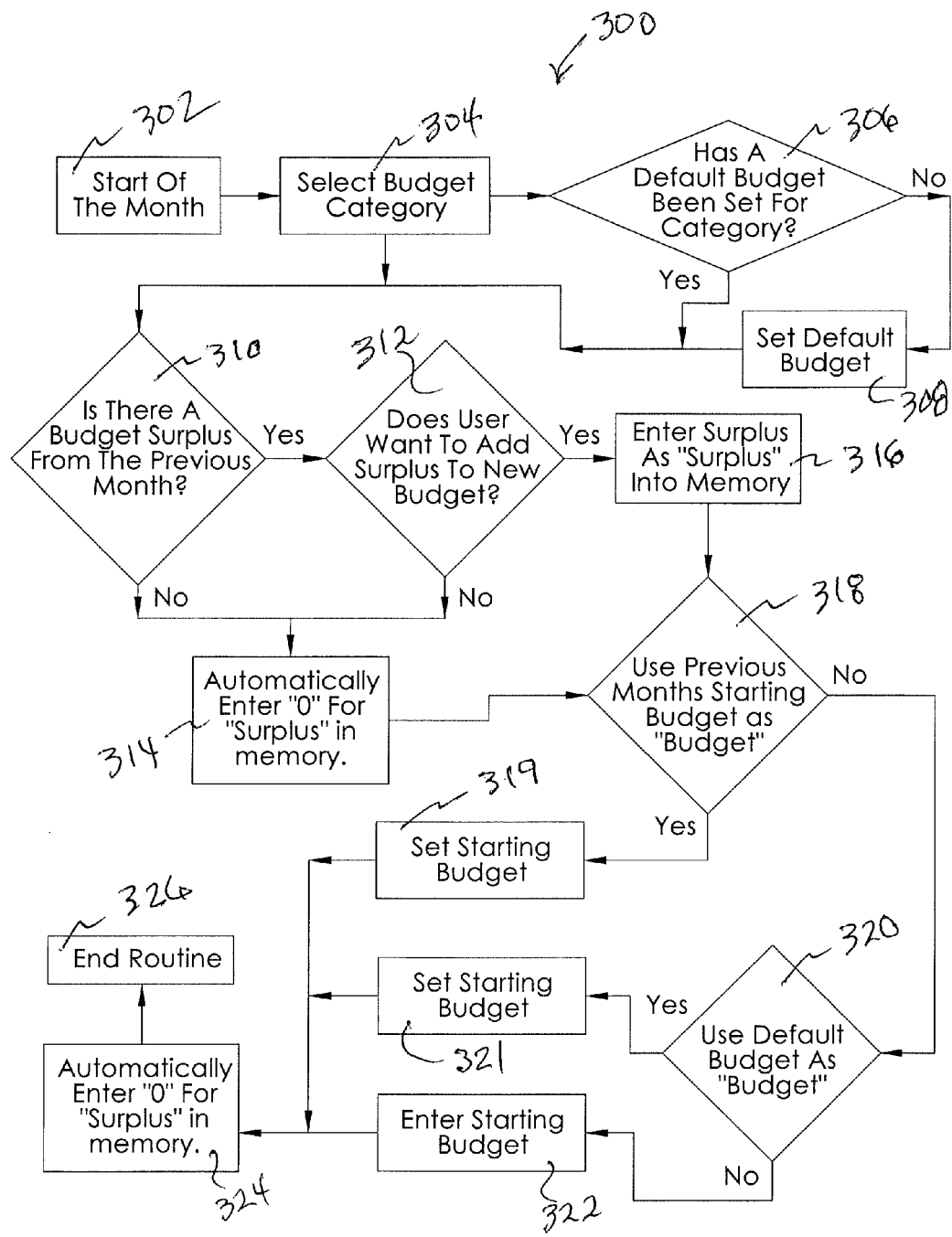
FIG. 3 is a flowchart illustrating the programming for operation of the apparatus.

FIG. 3 illustrates exemplary programming (i.e., routine 300) for associating beginning (or "initial") money values with the various budget categories in the electronic memory device 140. At step 302, the routine 300 is initiated. The routine 300 may be initiated using the input device 120, or may be initiated automatically (e.g., upon the start of each month). The routine 300 then proceeds to step 304, where a budget category is selected. The budget category may be selected using the input device 120, or may be selected automatically (e.g., in the order that the budget categories were input, in the order of the priority values, in any other order, or randomly). The routine 300 proceeds from step 304 to step 306.

At step 306, the processor 110 determines whether an acceptable default value has already been selected for the budget category at issue. If a default value has not been selected, or if the user indicates (through the input device 120) that the default value should be changed, the routine 300 continues to step 308, where a default value for the budget category is input through the input device 120 and saved in the memory device 140; the routine 300 then continues to step 310. If an acceptable default value was previously set, the routine 300 proceeds from step 306 to step 310.

At step 310, the processor 110 determines whether a surplus from the previous month exists (i.e., in the memory device 140) for the budget category at issue. If so, the routine 300 moves from step 310 to step 312. If not, the routine 300 moves from step 310 to step 314.

At step 312, the processor 110 determines whether the user wants to add the surplus from the previous month into the current month's budget (e.g., by actuating the display 130 to present an inquiry, and interpreting data received from the input device 120). If so, the routine 300 moves from step 312 to step 316; if not, the routine 300 moves from step 312 to step 314.

At step 314, the memory device 140 is updated to reflect no surplus associated with the budget category. In other words, any surplus associated with the budget category is removed at step 314. The routine 300 continues from step 314 to step 318.

At step 318, the processor 110 determines whether the user wants to use the previous month's starting budget as the current month's starting budget for the budget category at issue (e.g., by actuating the display 130 to present an inquiry, and interpreting data received from the input device 120). If so, the routine 300 moves from step 318 to step 319; if not, the routine 300 moves from step 318 to step 320.

At step 319, the previous month's starting budget (plus any surplus from step 316) is stored in the memory device 140 as the current month's starting budget for the budget category at issue. The routine 300 continues from step 319 to step 324.

At step 320, the processor 110 determines whether the user wants to use the default budget as the current month's starting budget for the budget category at issue (e.g., by actuating the display 130 to present an inquiry, and interpreting data received from the input device 120). If so, the routine 300 moves from step 320 to step 321; if not, the routine 300 moves from step 320 to step 322.

At step 321, the default budget (plus any surplus from step 316) is stored in the memory device 140 as the current month's starting budget for the budget category at issue. The routine 300 continues from step 321 to step 324. At step 322, the user selects a starting budget using the input device 120, and the selected starting budget (plus any surplus from step 316) is stored in the memory device 140 as the current month's starting budget for the budget category at issue. The routine 300 continues from step 322 to step 324.

At step 324, the memory device 140 is updated to reflect no surplus associated with the budget category. In other words, any surplus associated with the budget category is removed at step 324. The routine 300 continues from step 324 to step 326. At step 326, the routine 300 ends for the budget category at issue.

Figure 4:
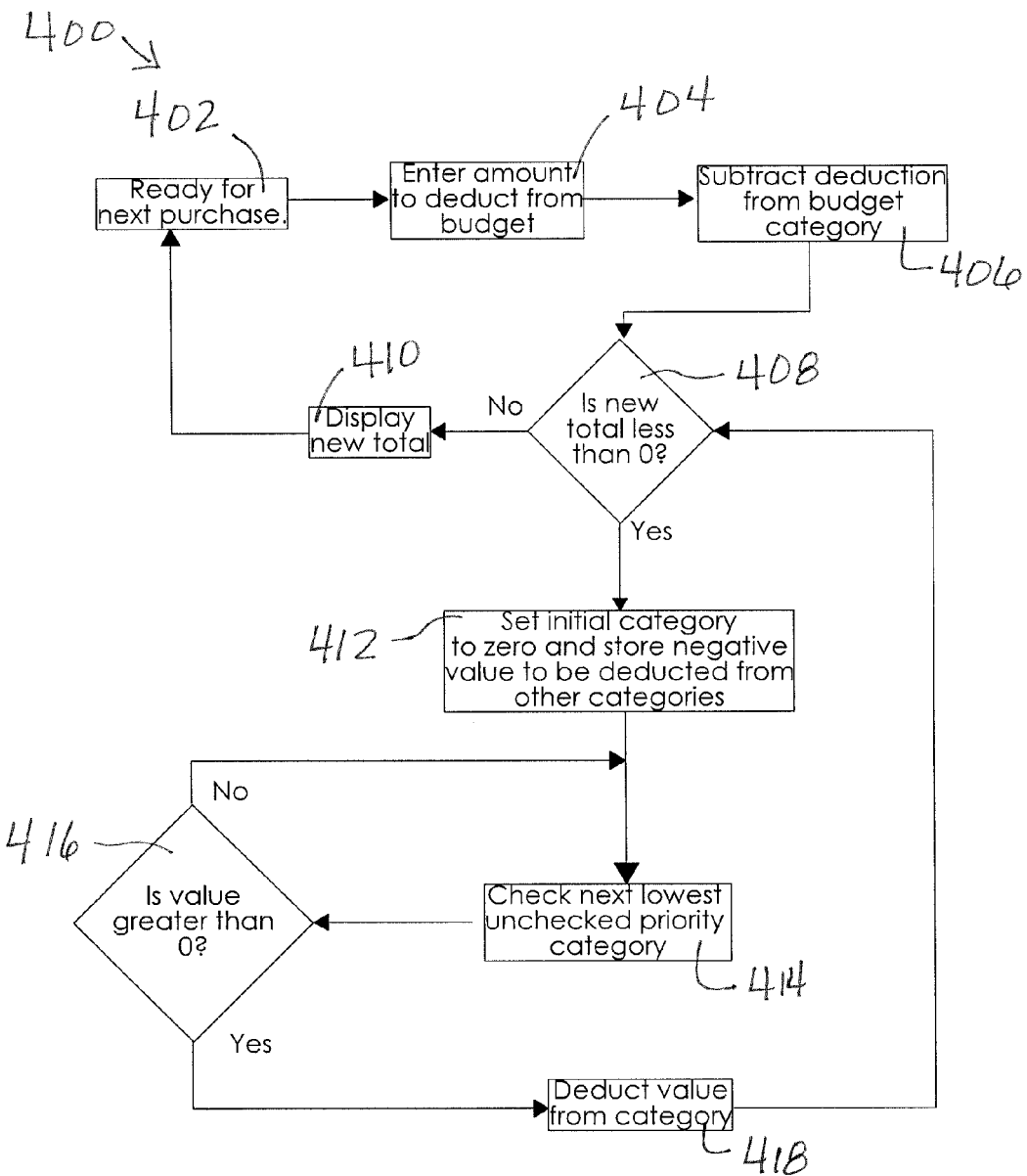
FIG. 4 is another flowchart illustrating the programming for operation of the apparatus.

FIG. 4 illustrates exemplary programming (i.e., routine 400) for using the budgeting device 100 after starting budget values are stored in the memory device 140 (e.g., through the routine 300). At step 402, the routine 400 is ready for expenditure data. Routine 400 proceeds from step 402 to step 404.

At step 404, an expenditure amount (or "expenditure value") and a budget category are provided to the processor 110 through the input device 120. The routine 400 then proceeds to step 406, where the expenditure amount is subtracted from the remaining monthly budget for the budget category at issue. It should be understood that the remaining monthly budget is initially the starting budget for the budget category at issue. If the expenditure amount is less than the remaining monthly budget (determined at step 408), the remaining monthly budget is updated in the memory device 140 to reflect the expenditure, the display 130 is actuated (at step 410) to present the remaining monthly budget for the budget category at issue, and the routine 400 returns to step 402. If the expenditure amount is more than the remaining monthly budget (determined at step 408), the remaining monthly budget for the budget category at issue is set to zero in the memory device 140 at step 412. Also at step 412, the difference between the expenditure amount and the remaining monthly budget is determined and stored in the memory device 140. The process 400 proceeds from step 412 to step 414.

At steps 414 and 416, the processor 110 reviews the remaining monthly budget in the budget category having the lowest priority that has not been checked to see if the remaining monthly budget is greater than zero. For example, if the highest priority category has a priority value of "1", and the lowest priority category has a priority value of "10", the budget category having the priority value of "10" is checked to see if its remaining monthly budget is greater than zero. If not, the budget category having the next-highest priority value is checked. If so, the routine 400 proceeds to step 418.

At step 418, the difference from step 412 is subtracted from the remaining monthly budget for the budget category now at issue (i.e., the budget category identified in steps 414 and 416). The routine 400 then returns to step 408, where the processor 110 determines whether the difference from step 412 is less than the remaining monthly budget for the budget category now at issue. If the difference from step 412 is more than the remaining monthly budget for the budget category now at issue, the routine moves to step 412; otherwise, the routine moves to step 410. The remaining monthly budget for multiple budget categories may be provided at step 410, as shown in FIG. 1, including those not being modified as well as those being modified.

The portable budgeting apparatus 100 may be best understood by reviewing a simplified example. This should be understood as only exemplary, however. In one example, following routine 200, a user enters a category of "housing" at step 204 and a priority of "1" at step 206. Additional categories and priorities are then added (through steps 208, 204, and 206) such that "food" has a priority of "2", "savings" has a priority of "3", and "entertainment" has a priority of "4". Continuing in the simplified example, then, the four budgeting categories are given starting budgets of $100 each by following routine 300.

Still continuing in the simplified example, if an expenditure value of $125 is input in step 404 for the "housing" category, the routine 400 would proceed to step 406 and subtract the $125 from the $100 starting budget in the "housing" category. Since the $125 expenditure is more than the $100 remaining monthly budget in the "housing" category, the remaining monthly budget for the "housing" category would be set to zero in the memory device 140 at step 412. Also at step 412, the $25 difference between the expenditure amount and the remaining monthly budget would be determined and stored in the memory device 140. The process 400 would proceed from step 412 to step 414. At steps 414 and 416, the processor 110 would review the remaining monthly budget in the budget category having the lowest priority that has not been checked (i.e., the "entertainment" category, which has a priority of "4") to see if the remaining monthly budget is greater than zero. Since it would be greater than zero in this example, the routine 400 would proceed to step 418. At step 418, the difference from step 412 (i.e., $25) would be subtracted from the remaining monthly budget for the budget category now at issue (i.e., the "entertainment" category). The routine 400 would then return to step 408, where the processor 110 would determine whether the difference from step 412 (i.e., $25) is less than the remaining monthly budget (i.e., $100) for the "entertainment" category. Because it is, the routine would then move to step 410.

For further illustration, an expenditure value of $180 is then input at step 404 for the "food" category in the current simplified example. The routine 400 would proceed to step 406 and subtract the $180 from the $100 starting budget in the "food" category. Since the $180 expenditure is more than the $100 remaining monthly budget in the "food" category, the remaining monthly budget for the "food" category would be set to zero in the memory device 140 at step 412. Also at step 412, the $80 difference between the expenditure amount and the remaining monthly budget would be determined and stored in the memory device 140. The process 400 would proceed from step 412 to step 414. At steps 414 and 416, the processor 110 would review the remaining monthly budget in the budget category having the lowest priority that has not been checked (i.e., the "entertainment" category, which has a priority of "4") to see if the remaining monthly budget is greater than zero. Since it would be greater than zero in this example, the routine 400 would proceed to step 418. At step 418, the difference from step 412 (i.e., $80) would be subtracted from the remaining monthly budget (i.e., $75) for the budget category now at issue (i.e., the "entertainment" category).

The routine 400 would then return to step 408, where the processor 110 would determine whether the difference from step 412 (i.e., $80) is less than the remaining monthly budget (i.e., $75) for the "entertainment" category. Since the difference from step 412 (i.e., $80) is more than the remaining monthly budget (i.e., $75) for the "entertainment" category, the routine moves to step 412. At step 412, the remaining monthly budget for the "entertainment" category would be set to zero in the memory device 140. Also at step 412, the $5 difference between the expenditure amount and the remaining monthly budget would be determined and stored in the memory device 140. The process 400 would proceed from step 412 to step 414. At steps 414 and 416, the processor 110 would review the remaining monthly budget in the budget category having the lowest priority that has not been checked (i.e., the "savings" category, which has a priority of "3") to see if the remaining monthly budget is greater than zero. Since it would be greater than zero in this example, the routine 400 would proceed to step 418. At step 418, the difference from step 412 (i.e., $5) would be subtracted from the remaining monthly budget (i.e., $100) for the budget category now at issue (i.e., the "savings" category). The routine 400 would then return to step 408, where the processor 110 would determine whether the difference from step 412 (i.e., $5) is less than the remaining monthly budget (i.e., $100) for the "savings" category. Because it is, the routine would then move to step 410.

It is understood that while certain forms of this invention have been illustrated and described, it is not limited thereto except insofar as such limitations are included in the following claims and allowable functional equivalents thereof.

The invention claimed is:
1. A portable budgeting apparatus, comprising:
a housing;
a display coupled to said housing;
an input device coupled to said housing;
an electronic memory device;
a processor in data communication with said display, said input device, and said electronic memory device; and
programming operable by said processor for:
(a) storing a plurality of budget categories in said electronic memory device, said budget categories being selected using said input device;
(b) storing a money value in said electronic memory device for each said budget category; each said stored money value being modifiable;
(c) storing a unique priority value for each said budget category in said electronic memory device;
(d) upon selection of a respective said stored budget category and input of an expenditure value using said input device, modifying said money value of said selected budget category by subtracting said expenditure value from said selected budget category's money value and, only if said expenditure value is greater than said selected budget category's money value, subtracting at least part of the difference between said selected budget category's money value and said expenditure value from said money value of a respective said budget category that has a said money value greater than zero and a said priority value that is lower than said priority values of all other said budget categories having money values greater than zero; and

(e) causing said display to output at least one said money value modified in accordance with step (d):
wherein step (b) comprises at least one of:
  (i) storing a default value as said money value in said electronic memory device for a respective said budget category;
  (ii) storing an initial value from a previous month as said money value in said electronic memory device for a respective said budget category;
  (iii) storing a value input using said input device as said money value in said electronic memory device for a respective said budget category;
  (iv) storing the sum of a default value and a surplus from a previous month as said money value in said electronic memory device for a respective said budget category; or
  (v) storing the sum of an initial value from a previous month and a surplus from a previous month as said money value in said electronic memory device for a respective said budget category;
wherein step (d) comprises:
  upon selection of a respective said stored budget category and input of an expenditure value using said input device, modifying said money value of said selected budget category by subtracting said expenditure value from said selected budget category's money value and, only if said expenditure value is greater than said selected budget category's money value:
    subtracting one part of the difference between said selected budget category's money value and said expenditure value from said money value of a respective said budget category that has a said money value greater than zero and a said priority value that is lower than said priority values of all other said budget categories having money values greater than zero; and
    subtracting another part of the difference between said selected budget category's money value and said expenditure value from said money value of another said budget category;
  programming operable by said processor for causing said display to output at least one said money value not being modified in accordance with step (d) while said display outputs at least one said money value modified in accordance with step (d);
wherein step (b) comprises at least one of:
  (i) storing the sum of a default value and a surplus from a previous month as said money value in said electronic memory device for a respective said budget category; or
  (ii) storing the sum of an initial value from a previous month and a surplus from a previous month as said money value in said electronic memory device for a respective said budget category.

2. The portable budgeting apparatus of claim 1, wherein step (b) is initiated automatically.

3. The portable budgeting apparatus of claim 1, wherein step (b) is initiated using said input device.

4. The portable budgeting apparatus of claim 1, further comprising programming operable by said processor for causing said display to output at least one said money value not being modified in accordance with step (d) while said display outputs at least one said money value modified in accordance with step (d).

5. The portable budgeting apparatus of claim 1, wherein step (d) comprises:
  upon selection of a respective said stored budget category and input of an expenditure value using said input device, modifying said money value of said selected budget category by subtracting said expenditure value from said selected budget category's money value and, only if said expenditure value is greater than said selected budget category's money value, subtracting the entire difference between said selected budget category's money value and said expenditure value from said money value of a respective said budget category that has a said money value greater than zero and a said priority value that is lower than said priority values of all other said budget categories having money values greater than zero.

6. The portable budgeting apparatus of claim 1, wherein step (d) comprises:
  upon selection of a respective said stored budget category and input of an expenditure value using said input device, modifying said money value of said selected budget category by subtracting said expenditure value from said selected budget category's money value and, only if said expenditure value is greater than said selected budget category's money value:
  subtracting one part of the difference between said selected budget category's money value and said expenditure value from said money value of a respective said budget category that has a said money value greater than zero and a said priority value that is lower than said priority values of all other said budget categories having money values greater than zero; and
  subtracting another part of the difference between said selected budget category's money value and said expenditure value from said money value of another said budget category.

7. The portable budgeting apparatus of claim 6, further comprising programming operable by said processor for causing said display to output at least one said money value not being modified in accordance with step (d) while said display outputs at least one said money value modified in accordance with step (d).

8. The portable budgeting apparatus of claim 7, wherein step (b) is initiated automatically.

9. The portable budgeting apparatus of claim 8, wherein said electronic memory device is contained in said housing and said processor is contained in said housing.

10. The portable budgeting apparatus of claim 9, wherein:
  said input device includes at least one of: a keypad, a switch, a knob, or a touchscreen; and
  said display includes at least one of: an LCD display, or an LED display.

11. The portable budgeting apparatus of claim 7, wherein step (b) is initiated using said input device.

* * * * *

UNITED STATES PATENT AND TRADEMARK OFFICE
CERTIFICATE OF CORRECTION

PATENT NO. : 8,510,353 B2  
APPLICATION NO. : 12/612799  
DATED : August 13, 2013  
INVENTOR(S) : Robert P. Neely and Harold E. Allison Page 1 of 3

It is certified that error appears in the above-identified patent and that said Letters Patent is hereby corrected as shown below:

On the title page, replace the informal drawing with the formal drawing of Fig 1.

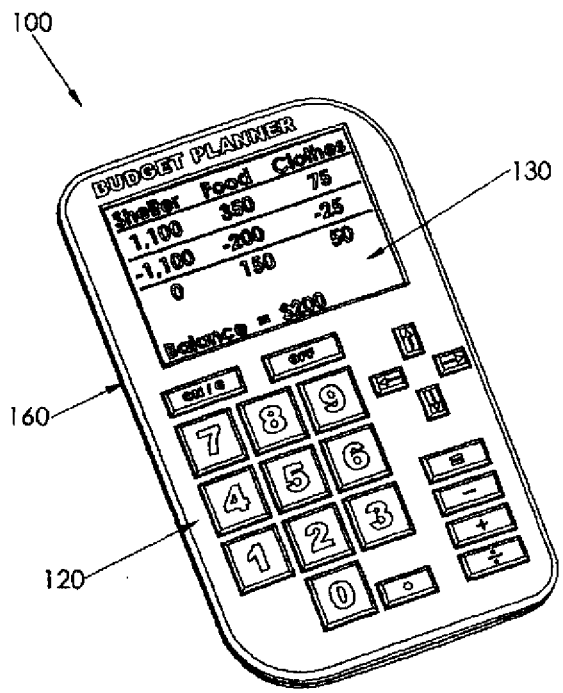

Signed and Sealed this  
Twenty-ninth Day of October, 2013

Teresa Stanek Rea  
*Deputy Director of the United States Patent and Trademark Office*

CERTIFICATE OF CORRECTION (continued)
U.S. Pat. No. 8,510,353 B2

In the Drawings:

On drawing Sheet 1 of 4, replace the informal drawing of Fig. 1 with formal drawing of Fig. 1.

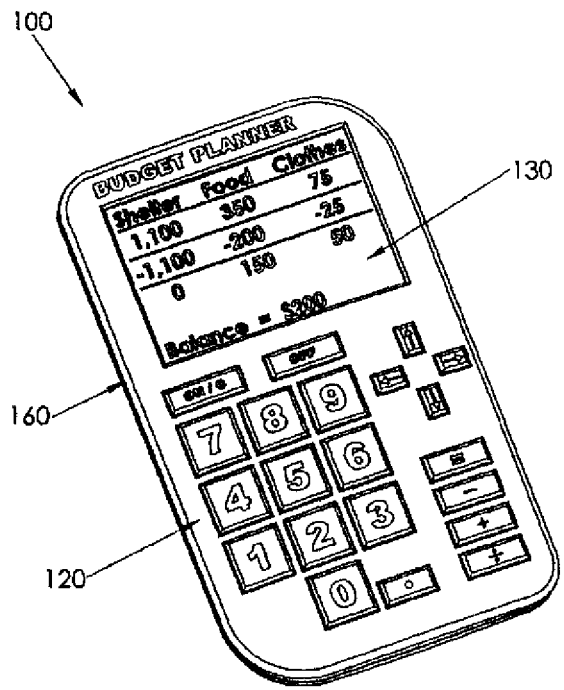

On drawing Sheet 2 of 4, replace the informal drawing of Fig. 2 with formal drawing of Fig. 2.

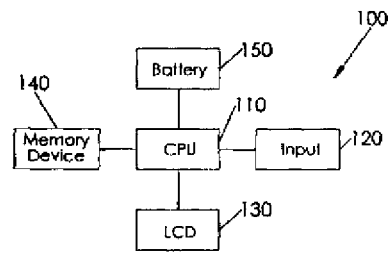

Fig. 2a

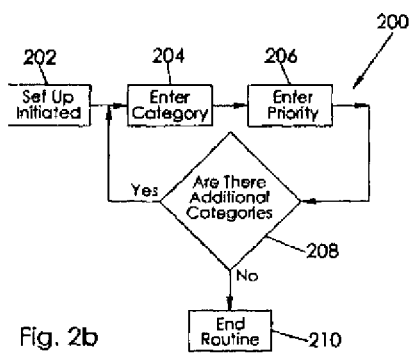

Fig. 2b

CERTIFICATE OF CORRECTION (continued)
U.S. Pat. No. 8,510,353 B2

On drawing Sheet 3 of 4, replace the informal drawing of Fig. 3 with formal drawing of Fig. 3.

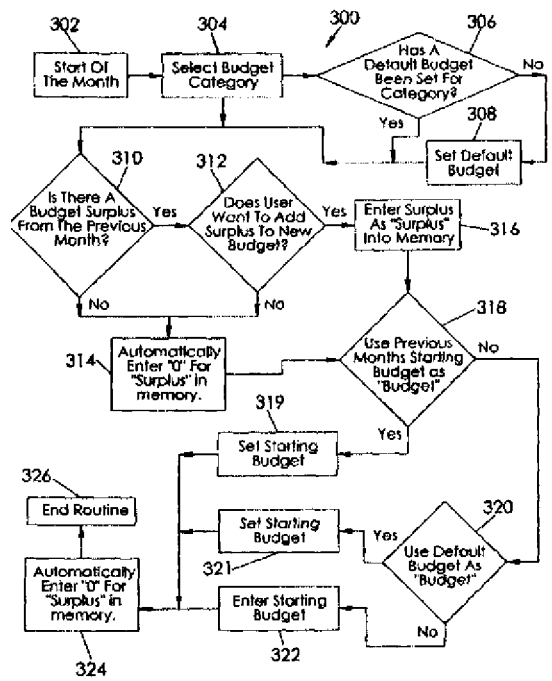

Fig. 3

On drawing Sheet 4 of 4, replace the informal drawing of Fig. 4 with formal drawing of Fig. 4.

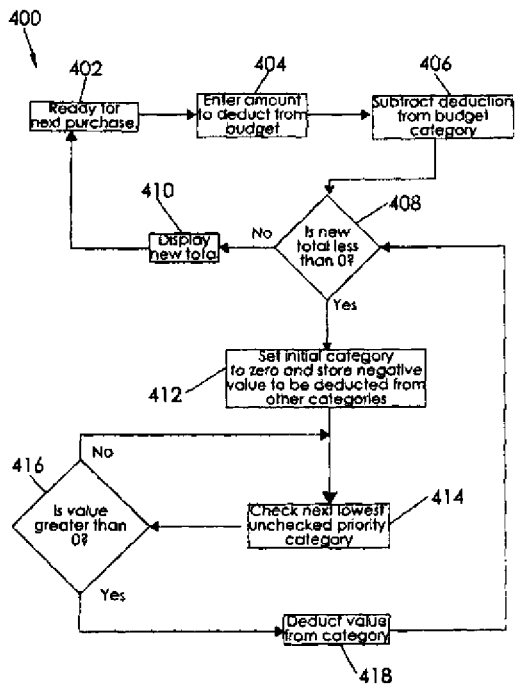

Fig. 4